United States Patent
Ikebukuro

(10) Patent No.: US 9,301,513 B2
(45) Date of Patent: Apr. 5, 2016

(54) FISHING REEL

(71) Applicant: Shimano Inc., Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/472,906

(22) Filed: Aug. 29, 2014

(65) Prior Publication Data

US 2015/0090824 A1   Apr. 2, 2015

(30) Foreign Application Priority Data

Sep. 30, 2013 (JP) ................. 2013-203881

(51) Int. Cl.
*A01K 89/01* (2006.01)
*A01K 89/015* (2006.01)

(52) U.S. Cl.
CPC .................... *A01K 89/015* (2013.01)

(58) Field of Classification Search
CPC ........... A01K 89/0111; A01K 89/0113; A01K 89/0162; A01K 89/01931
USPC .......................................... 242/322
See application file for complete search history.

(56) References Cited

U.S. PATENT DOCUMENTS

| | | | | |
|---|---|---|---|---|
| 6,045,073 A * | 4/2000 | Ikuta | ................. | A01K 89/033 242/260 |
| 6,412,723 B1 * | 7/2002 | Yamaguchi | .......... | A01K 89/015 116/299 |
| 6,851,638 B2 * | 2/2005 | Maeda | ................. | A01K 89/00 242/320 |
| 7,097,124 B2 * | 8/2006 | Ikuta | ................. | A01K 89/033 242/322 |
| 8,066,216 B2 * | 11/2011 | Takechi | ............... | A01K 89/033 242/246 |
| 2002/0027176 A1 * | 3/2002 | Ikuta | ................. | A01K 89/015 242/247 |
| 2007/0029427 A1 * | 2/2007 | Morise | ................. | A01K 89/01 242/317 |
| 2008/0290202 A1 * | 11/2008 | Ochiai | ............... | A01K 89/0111 242/246 |
| 2009/0200412 A1 * | 8/2009 | Hoshi | ................. | A01K 89/027 242/243 |
| 2012/0223173 A1 * | 9/2012 | Niitsuma | ............. | A01K 89/015 242/322 |

FOREIGN PATENT DOCUMENTS

| | | |
|---|---|---|
| JP | 11-225633 A | 8/1999 |
| JP | 2007-97474 Y2 | 4/2007 |

* cited by examiner

*Primary Examiner* — Emmanuel M Marcelo
(74) *Attorney, Agent, or Firm* — Global IP Counselors

(57) ABSTRACT

A dual-bearing reel includes a reel body, a spool shaft, and a spool body. The spool shaft is rotatably mounted to the reel body. The spool body is non-rotatably mounted to the spool shaft. The spool body has an insertion hole. The spool shaft is inserted into the insertion hole. The spool shaft has an insertion region. The insertion region is inserted into the insertion hole and is disposed to oppose a surface of the insertion hole. The insertion region has a first region and a second region. A first gap is disposed between the first region and the insertion hole. A second gap that is smaller than the first gap is disposed between the second region and the insertion hole.

6 Claims, 9 Drawing Sheets

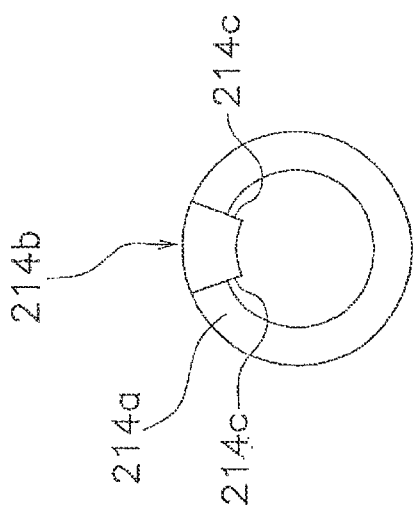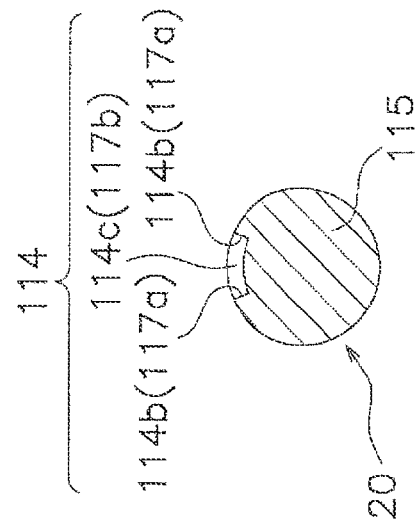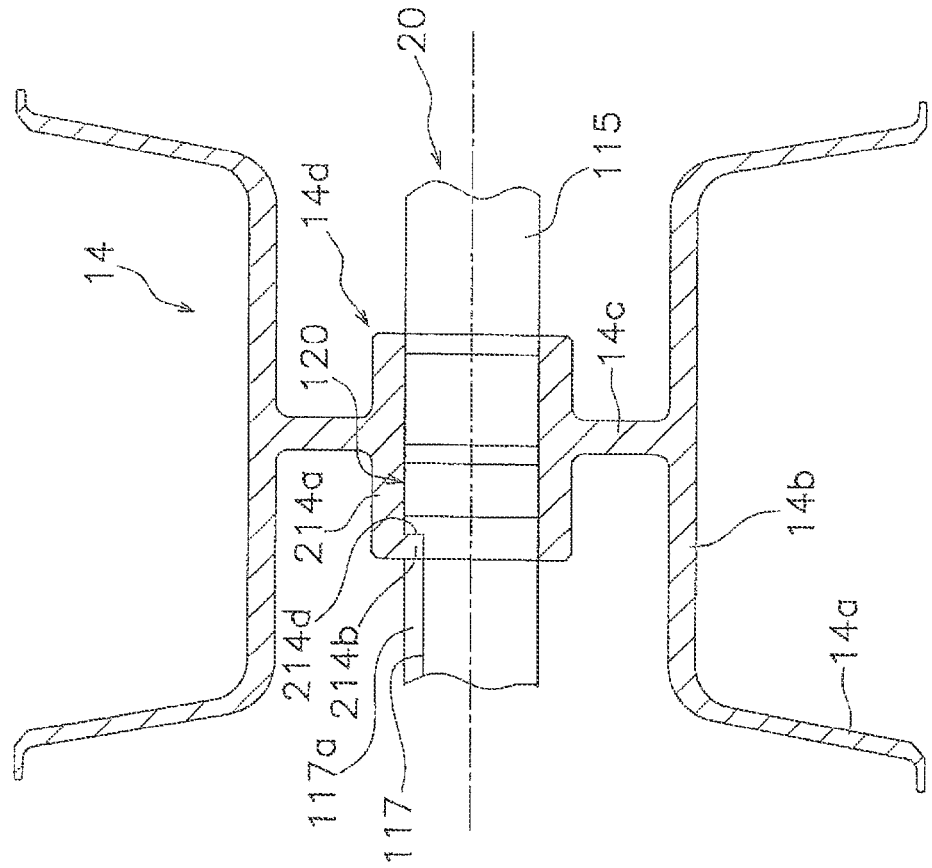

FISHING REEL

CROSS-REFERENCE TO RELATED APPLICATIONS

This application claims priority to Japanese Patent Application No. 2013-203881, filed on Sep. 30, 2013. The entire disclosure of Japanese Patent Application No. 2013-203881 is hereby incorporated herein by reference.

BACKGROUND

1. Field of Invention

The present invention relates to a fishing reel.

2. Background Information

A fishing reel, for example, a dual-bearing reel can include a reel body, a spool shaft on which the reel body is rotatably mounted, and a spool body that is non-rotatably mounted to the spool shaft (refer to Japanese Patent Application Publication No. 2007-97474 and Japanese Unexamined Patent Application Publication No. H11-225633). The spool body has an insertion hole for the insertion of the spool shaft. The spool shaft has a region an insertion region) that opposes a surface of the insertion hole. Also, the spool shaft has the same diameter in the insertion region. A prescribed gap is formed between the insertion hole of the spool body and the insertion region of the spool shaft, and an adhesive is disposed in this gap.

In this type of dual-bearing reel, first, an adhesive is coated on the insertion region of the spool shaft. Next, the spool shaft is inserted into the insertion hole of the spool body. Then, the insertion region of the spool shaft is inserted inside of the insertion hole. When the adhesive hardens in the gap between the insertion hole of the spool body and the insertion region of the spool shaft, the spool shaft is fixed to the spool body.

SUMMARY

In the conventional dual-bearing reel, the spool shaft is fixed to the spool body by inserting the insertion region of the spool shaft into the insertion hole of the spool body and solidifying the adhesive in the gap between the two. In this case, the insertion region of the spool shaft is inserted into the insertion hole of the spool body. Therefore, there is a concern that the adhesive that is coated in the insertion region of the spool shaft will be pushed out from the gap. Consequently, there is a concern that the adhesive will not be uniformly disposed in this gap. On the other hand, to create a gap that will enable the adhesive to be disposed uniformly, the gap needs to be relatively large. Such a large gap may negatively affect the positioning precision of the spool body in relation to the spool shaft in the radial direction.

The present invention was made by taking the problem described above into consideration, and the object of the present invention is to provide a fishing reel capable of improving the positioning precision of the spool body in relation to the spool shaft and reliably fixing the spool body and the spool shaft.

The fishing reel related to a first aspect of the present invention comprises a reel body, a spool shaft, and a spool body. The spool shaft is rotatably mounted to the reel body. The spool is non-rotatably mounted to the spool shaft. The spool body has an insertion hole. The spool shaft is inserted into the insertion hole. The spool shaft has an insertion region. The insertion region is inserted into the insertion hole and is disposed so as to oppose a surface of the insertion hole. The insertion region has a first region and a second region. A first gap is disposed between the first region and the insertion hole. A second gap that is smaller than the first gap is disposed between the second region and the insertion hole.

According to the present fishing reel, the insertion region of the spool shaft is disposed to oppose a surface of the insertion hole. A first gap is also disposed between the first region of the insertion region and the insertion hole. Additionally, a second gap that is smaller than the first gap is disposed between the second region of the insertion region and the insertion hole. Accordingly, the insertion region of the spool shaft is formed such that the second gap between the second region of the insertion region and the insertion hole is smaller than the first gap between the first region of the insertion region and the insertion hole.

In this configuration, it is possible to fix the insertion region (the region that includes the first region and the second region) into the insertion hole by disposing a fixing agent, for example, an adhesive, in the first gap and the second gap. In particular, in the present fishing reel, the spool body and the spool shaft can be reliably fixed in the first region. Also, the second gap between the second region of the insertion region and the insertion hole is smaller than the first gap between the first region of the insertion region and the insertion hole. Therefore, improving the positioning precision in the radial direction of the spool body (hereinafter referred to as the positioning precision of the spool body) in relation to the spool shaft in the second region is possible.

In the fishing reel related to the second aspect of the present invention, the second region in the fishing reel according to the first aspect is disposed on both end portions of the insertion region.

In this configuration, a second region has two parts, a first part of the two parts of the second region being disposed on a first end portion of the insertion region, and a second part of the two parts of the second region on a second end portion of the insertion region. Therefore, when the insertion region of the spool shaft is inserted into the insertion hole of the spool body, the fixing agent, for example, the adhesive, is held back by the two parts of the second region on the first and second end portions of the insertion region and is not easily pushed out in the direction parallel to the spool shaft. Accordingly, it is possible to reliably hold the prescribed adhesive between the two parts of the second region on bath end portions of the insertion region (in the direction parallel to the spool shaft). Accordingly, the insertion region can be fixed reliably to the insertion hole. Even the fixing agent, for example, the adhesive, in the second gap between the second region and the insertion hole contributes to the fixation of the insertion region and the insertion hole.

In the fishing reel related to the third aspect of the present invention, the first region in the fishing reel according to the second aspect is disposed between the two parts of the second region disposed on the first and second end portions of the insertion region.

In this configuration, the first region is disposed between the two parts of the second region disposed on the first and second end portions of the insertion region. Also, the first gap between the first region and the insertion hole is larger than the second gap between the second region and the insertion hole. Accordingly, when the insertion region of the spool shaft is inserted into the insertion hole of the spool body, the fixing agent, for example, the adhesive, is held back by the two parts of the second region and is not easily pushed out in the direction parallel to the spool shaft. Consequently, it is possible to reliably hold the prescribed adhesive in the first gap (>second gap) between the first region and the insertion hole. Accordingly, the insertion region can be reliably fixed to the insertion hole. Even the fixing agent, for example, the adhesive, in the second gap between the second region and the insertion hole contributes to the fixation of the insertion region and the insertion hole.

In the fishing reel related to the fourth aspect of the present invention, the first region in the fishing reel according to any one of the first to third aspects is fixed to the insertion hole via the fixing agent in the first gap. The second region positions the spool body in the radial direction and, moreover, is fixed to the insertion hole via the fixing agent in the second gap.

In this configuration, the primary fixation of the insertion region and the insertion hole is carried out by the first region, and the secondary fixation of the insertion region and the insertion hole is carried out by the second region. Also, the positioning of the spool body in the radial direction in relation to the spool shaft is carried out in the second region. Accordingly, the positioning precision of the spool body can be improved, and the spool body and the spool shaft can be fixed reliably.

In the fishing reel related to the fifth aspect of the present invention, the insertion region in the fishing reel according to any one of the second to fourth aspects also has a third region. At least to two first region parts are disposed between the two parts of the second region disposed on the first and second end portions of the insertion region. The third region is disposed between the at least two first region parts. A third gap that is larger than the first gap is disposed between the third region and the insertion hole.

In this configuration, the third region is disposed between the at least two first region parts, and the third gap that is larger than the first gap is disposed between the third region and the insertion hole. Accordingly, the fixing agent, for example, the prescribed adhesive that was excessive in the first gap between the first region and the insertion hole, can be held in the third gap (>first gap) between the third region and the insertion hole. Consequently, when the insertion region of the spool shaft is inserted into the insertion hole of the spool body, the adhesive is held back by the two parts of the second region and is not easily pushed out in the direction parallel to the spool shaft. Also, filling the adhesive in the first gap and the third gap disposed between the two parts of the second region in the direction parallel to the spool shaft is possible. Accordingly, the positioning precision of the spool body in relation to the spool shaft can be improved, and the spool body and the spool shaft can be fixed more reliably.

In the fishing reel related to the sixth aspect of the present invention, the third region in the fishing reel according to the fifth aspect is fixed to the insertion hole via the fixing agent in the third gap. The fixing agent in the third gap includes the fixing agent that infiltrated from the first gap.

In this configuration, the fixing agent, for example, the adhesive, can infiltrate from the first gap between the first region and the insertion hole to the third gap between the third region and the insertion hole. Thus, the third region that forms the third gap functions as a region for retaining the excess adhesive. Accordingly, it is possible to fill the adhesive in the first gap and the third gap, and the spool body and the spool shaft can be more reliably fixed.

According to the present invention, it is possible to provide a fishing reel capable of improving the positioning precision of the spool body in relation to the spool shaft and reliably fixing the spool body and the spool shaft.

As described above, according to the present invention, the wear of the brake shoe of the braking operation lever disposed on the rotor braking device can be suppressed while expanding the adjustment range of the braking force. Additionally, the elastic member installed in the braking operation lever can be prevented from falling out. As described above, according to the present invention, the wearing of the brake shoe of the braking operation lever installed on the rotor braking device can be suppressed while extending the adjustment range of the braking force.

BRIEF DESCRIPTION OF THE DRAWINGS

FIG. 10A is a cross-sectional view of the spool unit according to the third embodiment of the present invention.

FIG. 10B is a side view of the shaft mounting portion of the spool body according to the third embodiment of the present invention.

FIG. 10C is a cross-sectional view of the spool shaft according to the third embodiment of the present invention.

DETAILED DESCRIPTION OF THE INVENTION

Figure 1:
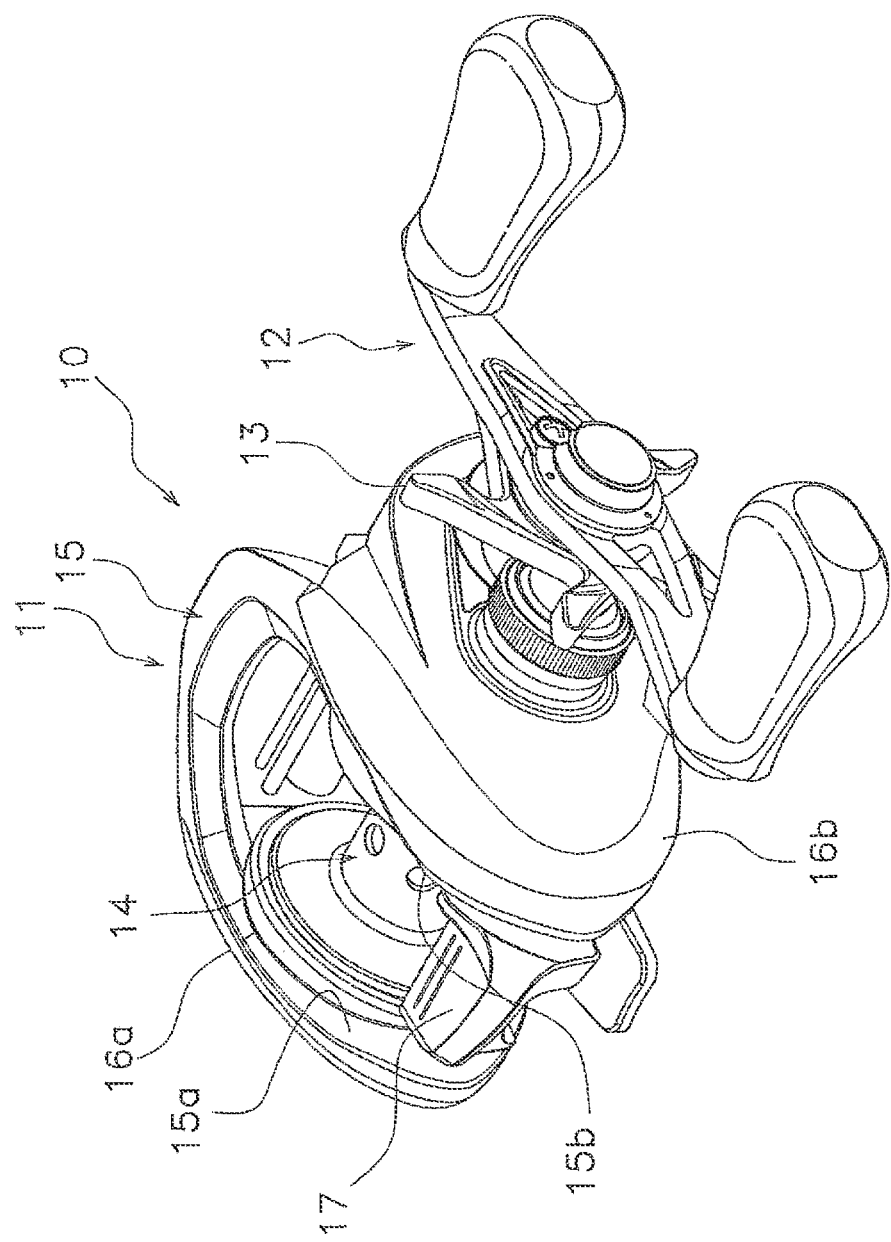
FIG. 1 is a perspective view of a dual-bearing reel according to the first embodiment of the present invention.
Figure 2:
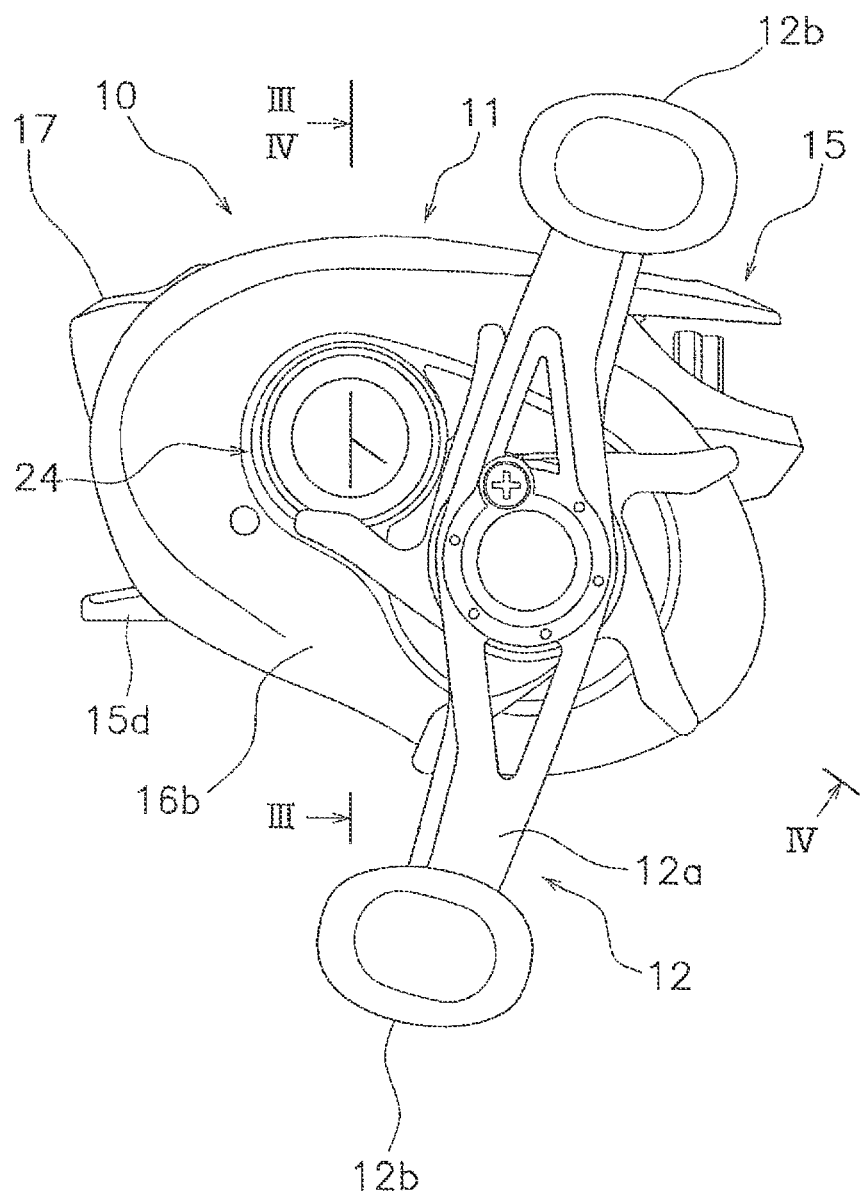
FIG. 2 is a right side view of the above.

The present invention can be used extensively in fishing reels.

First Embodiment

1. Overall Configuration of the Reel

As illustrated in FIG. 1 to FIG. 4, the dual-bearing reel 10 according to an embodiment of the present invention is a dual-bearing reel for bait casting. This reel is equipped with a reel body 11, a handle 12 for rotating a spool unit 9 disposed at the side of the reel body 11, a star drag 13 for adjusting the drag disposed on the reel body 11 side of the handle 12, and the spool unit 9 comprised of a spool body 14 and a spool shaft 20.

The handle 12 has an arm part 12a and a handle 12b that is rotatably mounted on both ends of the arm part 12a. The arm part 12a is non-rotatably mounted to the extreme end of the drive shaft 30 and is fastened to the drive shaft 30 with a nut 28. The handle 12 is disposed on the second cover 16b side described below.

2. Configuration of the Reel Body

The reel body 11 is a member made from a light metal such as a magnesium alloy or the like. As illustrated in FIG. 1 to FIG. 4, the reel body 11 has a frame 15, a first side cover 16a and a second side cover 16b mounted on both sides of the frame 15, and a shaft support part 35. The spool body 14 is rotatably mounted on the inside of the reel body 11 via a spool shaft 20. The first side cover 16a is detachably mounted to the first side plate 15a and covers the outside of the first side plate 15a. The second side cover 16b is screwed to the second side plate 15b and covers the outside of the second side plate 15b.

As illustrated in FIG. 1 to FIG. 4, the spool body 14, a clutch operating member 17 for applying the thumb when touching the thumb to the spool, and a level winding mechanism 18 for winding the fishing line evenly onto the spool body 14 are disposed in the frame 15.

Also, a gear mechanism 19, a clutch mechanism 21, a clutch control mechanism 22, a drag mechanism 23, and a casting control mechanism 24 are disposed between the frame 15 and the second side cover 16b.

Figure 4:
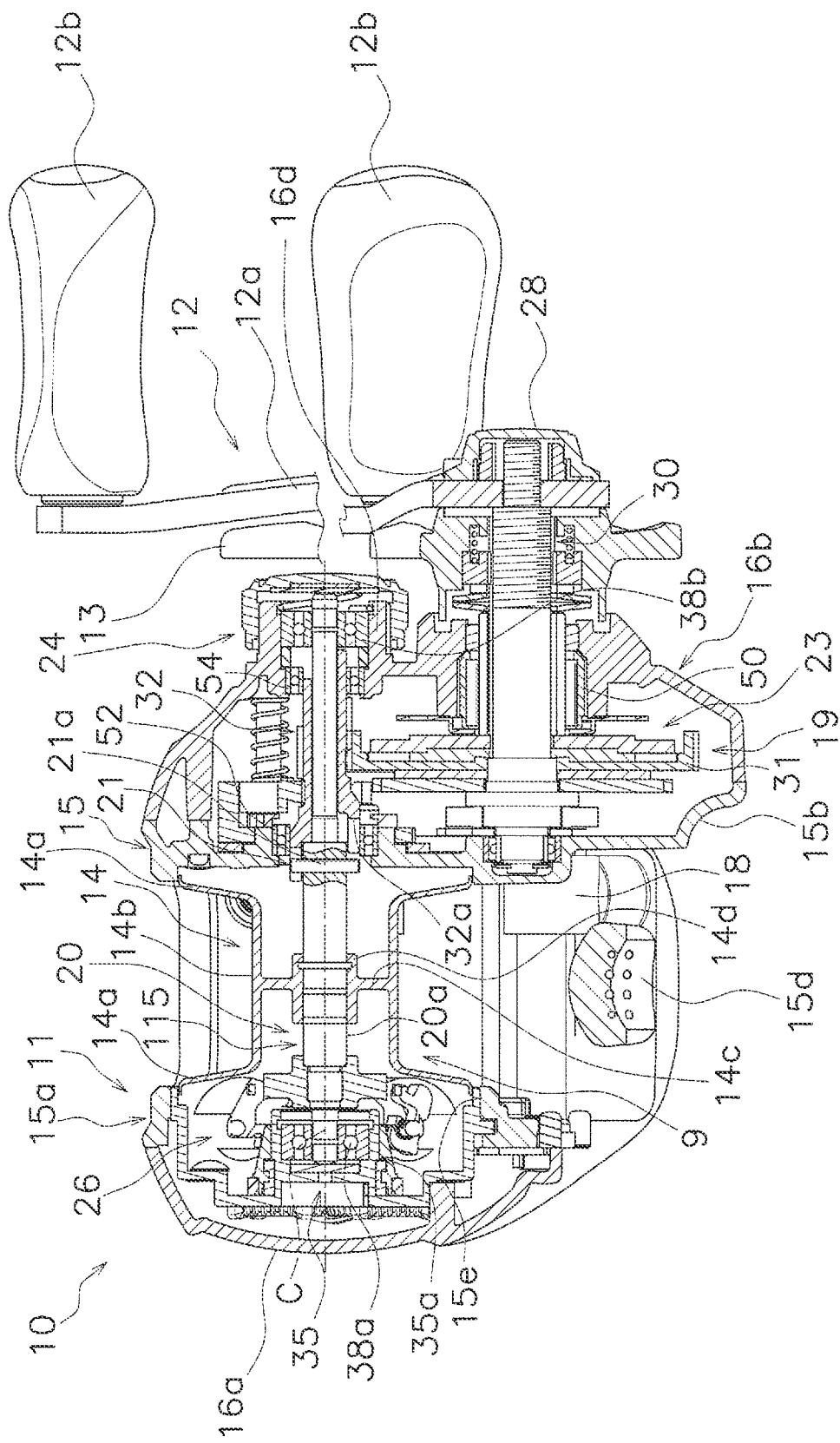
FIG. 4 is a cross-sectional view at section IV-IV in FIG. 2.

The gear mechanism 19 is disposed so as to transmit the rotational force from the handle 12 to the spool body 14 and the level winding mechanism 18. The gear mechanism 19 has a drive shaft 30, a drive gear 31 fixed to the drive shaft 30, and a cylindrical pinion gear 32 that meshes with the drive gear 31, as illustrated in FIG. 4. The drive shaft 30 is rotatably mounted to the second side plate 15b and the second side cover 16b. The drive shaft 30 is prohibited from rotating (reversing) in the fishing line releasing direction according to a roller-type one-way clutch 50. The roller-type one-way clutch 50 is disposed between the second side cover 16b and the drive shaft 30. The drive gear 31 is rotatably mounted to the drive shaft 30 and is coupled to the drive shaft 30 via the drag mechanism 23.

Figure 3:
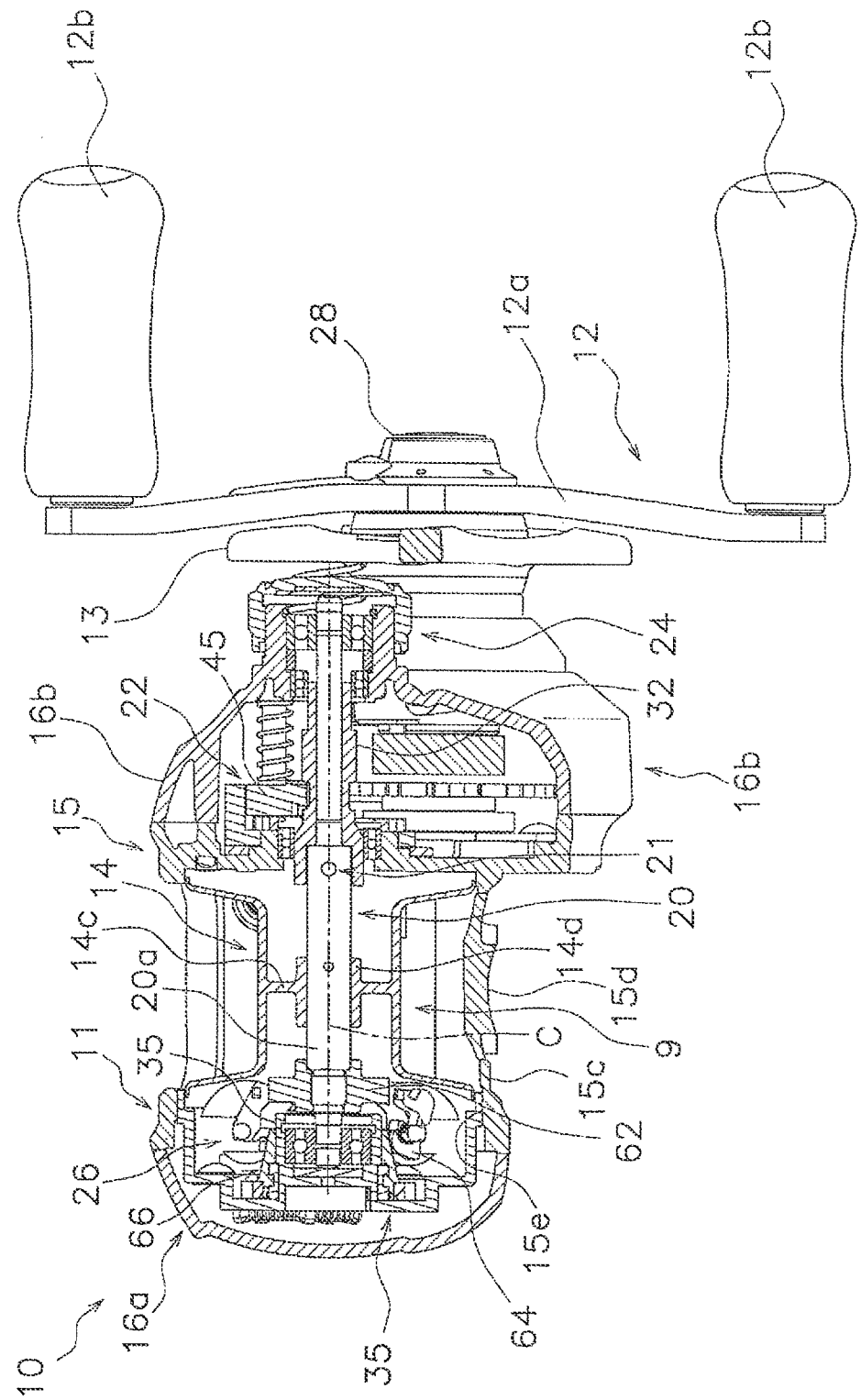
FIG. 3 is a cross-sectional view at section III-III in FIG. 2.

The clutch mechanism 21 is disposed so as to connect and disconnect the spool body 14 and the handle 12. The clutch control mechanism 22 is disposed so as to control the clutch mechanism 21 according to an operation of a clutch operating member 17. As illustrated in FIG. 3, the clutch control mechanism 22 has a clutch yoke 45 that moves the pinion gear 32 along the direction of the spool shaft 20. When the clutch operating member 17 is manipulated to the clutch off position, the clutch yoke 45 moves the pinion gear 32 to the clutch off position. Also, the clutch control mechanism 22 has a clutch returning mechanism not illustrated in the drawing that turns on the clutch mechanism 21 by interlocking with the rotation of the spool body 14 in the fishing line winding direction.

As illustrated in FIG. 1, the clutch operating member 17 is disposed behind the spool body 14 at the rear part between the first side plate 15a and the second side plate 15b. The clutch operating member 17 is coupled to the clutch control mechanism 22. The clutch mechanism 21 is switched between the connected state and the disconnected state by sliding the clutch operating member 17. The drag mechanism 23 is provided to apply a brake to the rotation of the spool body 14 in the fishing line releasing direction. The casting control mechanism 24 is provided to adjust the resistance force when the spool body 14 is rotating.

The spool braking device 26 prohibits backlash at the time of casting according to the function of centrifugal force. The spool braking device 26 is disposed between the frame 15 and the first side cover 16a. The spool braking device 26 is equipped with a brake drum 66, a rotating member 62, and a plurality of (e.g., 6) brake shoes 64, as illustrated in FIG. 3. The brake drum 66 is supported by the shaft supporting part 35 in the radially inward direction of the brake shoe 64. The rotating member 62 is coupled to the spool shaft 20 so as to rotate integrally according to a suitable fixing means or manner, such as a press fitting or the like. The brake shoe 64 is mounted to the rotating member 62 to rock around an axis that counters the spool shaft 20. In the spool braking device 26, the brake shoe 64 rocks according to centrifugal force and contacts the brake drum 66 when the spool body 14 rotates. Accordingly, braking is applied to the rotation of the spool body 14.

As illustrated in FIG. 3 and FIG. 4, the pinion gear 32 penetrates the second side plate 15b and extends in the direction of the spool shaft 20. The pinion gear 32 is a cylindrical member, the center of which is penetrated by the spool shaft 20. The pinion gear 32 is mounted to the second side plate 15b and the second side cover 16b to rotate and to move in the axial direction. The pinion gear 32 is supported by a bearing 52 and a bearing 54. An engaging groove 32a that engages with the clutch pin 21a is formed at one end (the left end in FIG. 4) of the pinion gear 32. The clutch mechanism 21 is formed from this pinion gear 32 and the clutch pin 21a. The pinion gear 32 is moved to the clutch on position and the clutch off position by the clutch control mechanism 22.

As illustrated in FIG. 3 and FIG. 4, the frame 15 has a first side plate 15a, a second side plate 15b that is disposed a prescribed space from the first side plate 15a and opposing the first side plate, and plural (e.g., 3) coupling portions 15c that integrally couple the first side plate 15a and the second side plate 15b at the front, the rear, and the bottom portions. A fishing pole mounting part 15d for mounting a fishing pole is integrally formed to the bottom side coupling portion 15c. An open part 15e formed into a circular shape with the shaft core C of the spool shaft 20 as the center is formed at the center part of the first side plate 15a. A shaft supporting part 35 is detachably coupled to the open part 15e.

As illustrated in FIG. 3 and FIG. 4, the spool unit 9 is primarily configured from the spool body 14 and the spool shaft 20. The spool body 14 is mounted to the spool shaft to rotate integrally. For example, the spool body 14 is disposed between the first side plate 15a and the second side plate 15b. The spool body 14 is rotatably supported by the reel body 11.

The spool body 14 has a fishing line winding cylindrical portion (here-in-after "shell portion") 14b, flange portion 14a, a coupling portion 14c, and a shaft mounting portion 14d. The shell portion 14b is formed into a cylindrical shape and a fishing line is wound on the outer peripheral portion. The flange portion 14a is disposed on both end portions of the shell portion 14b. The coupling portion 14c couples the shell portion 14b and the shaft mounting portion 14d. The coupling portion 14c is formed into a ring shape. The coupling portion 14c is formed integrally with the shell portion 14b and the shaft mounting portion 14d.

The shaft mounting portion 14d is the portion for mounting the spool body 14 to the spool shaft 20. The shaft mounting portion 14d is mounted to the inner peripheral portion of the shell portion 14b. Specifically, the shaft mounting portion 14d is formed to be integral to the coupling portion 14c at the inner peripheral portion of the coupling portion 14c. The shaft mounting portion 14d is formed into a cylindrical shape. Accordingly, the shaft mounting portion 14d has an insertion hole 64d (refer to FIG. 6) where the spool shaft 20 is inserted. The spool shaft 20 is inserted through the insertion hole 64d of the shaft mounting portion 14d, and the spool body 14 is mounted to the spool shaft 20 to rotate integrally.

Figure 5:
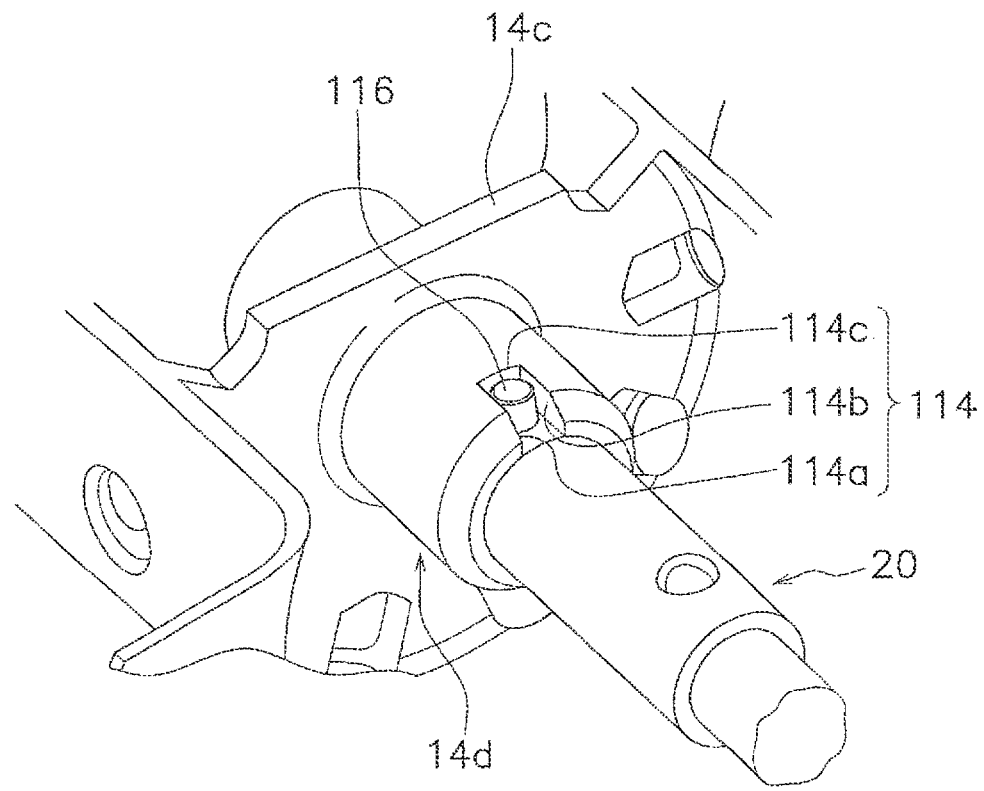
FIG. 5 is a partially enlarged perspective view of a spool unit.
Figure 6:
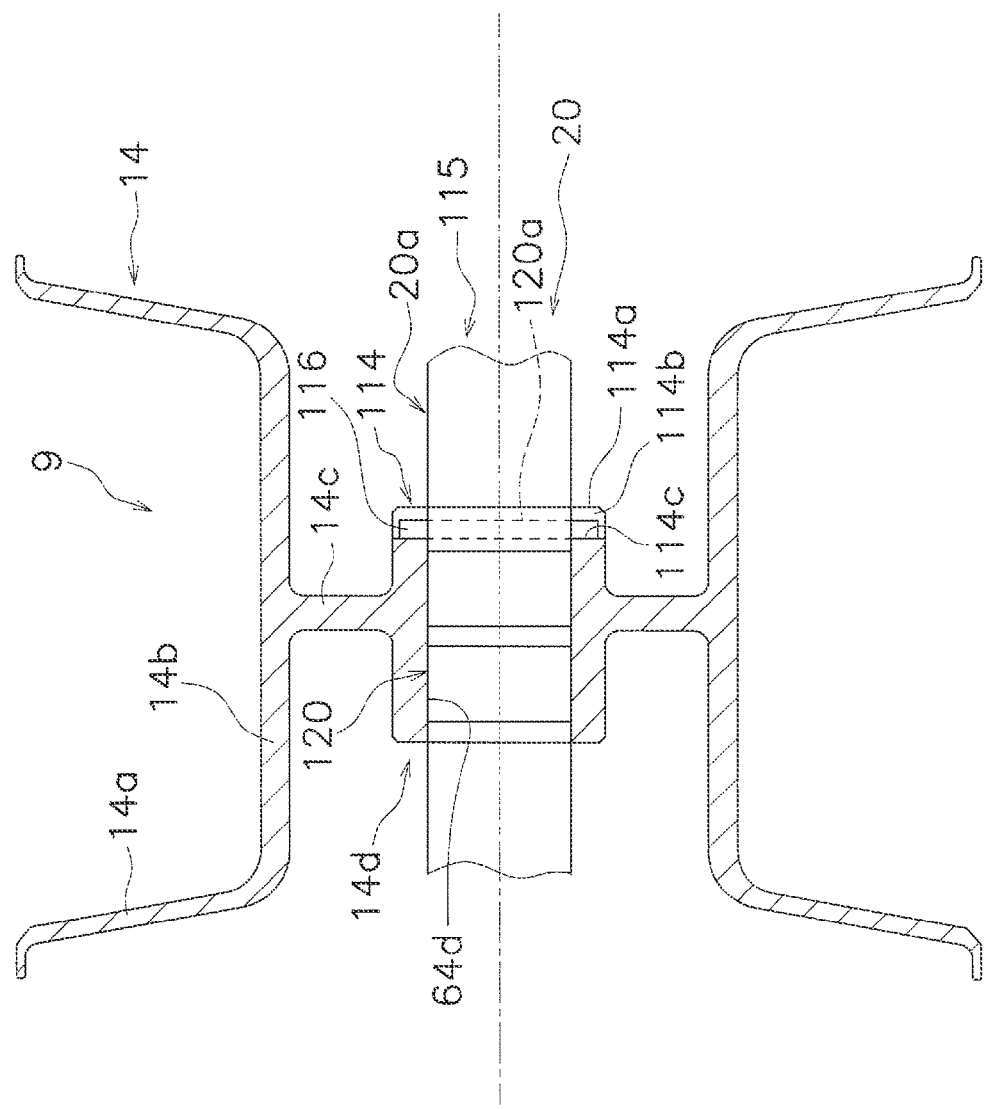
FIG. 6 is a cross-sectional view of the spool unit.

As illustrated in FIG. 5 and FIG. 6, the shaft mounting portion 14d has a notch part 114. The notch part 114 is disposed on the end portion of the shaft mounting portion 14d. Also, the notch part 114 is cut out or formed in the direction parallel to the spool shaft 20. For example, the notch part 114 is formed in a concave shape at the end portion of the shaft mounting portion 14d. In the notch part 114, for example, the concave part has an open end section 114a, a first contact section 114b, and a second contact section 114c. The open end section 114a is the section that opens toward the direction that is parallel to the spool shaft 20. The first contact section 114b is a pair of wall parts that mutually oppose each other in the concave-shaped notch part 114. A protruding portion makes contact with the first contact section 114b in the rotational direction of the spool shaft 20. The second contact section 114c is the bottom section of the concave-shaped notch part 114. A protruding pin 116 described below contacts the second contact section 114c in the direction parallel to the spool shaft 20.

The spool shaft 20 is rotatably disposed on the reel body 11. The spool body 14 is mounted on the spool shaft 20. For example, the spool shaft 20 is made from a non-magnetic metal. As illustrated in FIG. 3 and FIG. 4, the spool shaft 20 penetrates the second side plate 15b and extends to the outside of the second side cover 16b.

As illustrated in FIG. 4, FIG. 5, and FIG. 6, the spool shaft 20 has a shaft body part 115 and a protruding pin 116. The one end (the left side in FIG. 4) of the shaft body part 115 is rotatably supported in a bearing storage part 35a via a bearing 38a. The other end (the right side in FIG. 4) of the shaft body part 115 that extends toward the outside of the second side cover 16b is rotatably supported in the boss part 16d formed to the second side cover 16b by a bearing 38b.

As illustrated in FIG. 4, a large-diameter section 20a is formed at the middle portion of the shaft body part 115. A clutch pin 21a that forms the clutch mechanism 21 is disposed in the section where the large-diameter section 20a penetrates the second side plate 15b by penetrating the plate in the radial direction. Both ends of the clutch pin 21a protrude respectively from the outer peripheral surface of the spool shaft 20.

Figure 7:
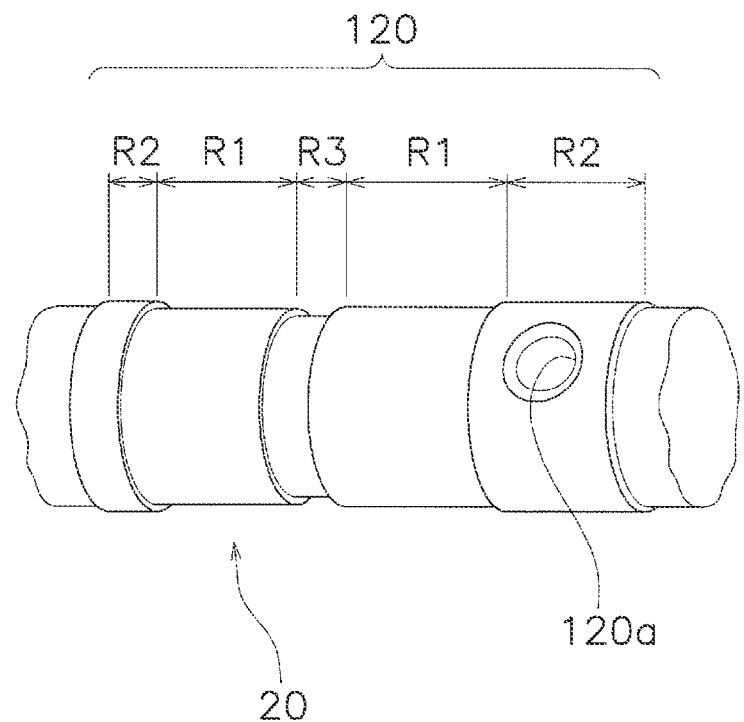
FIG. 7 is a partially enlarged perspective view of a spool shaft.
Figure 8:
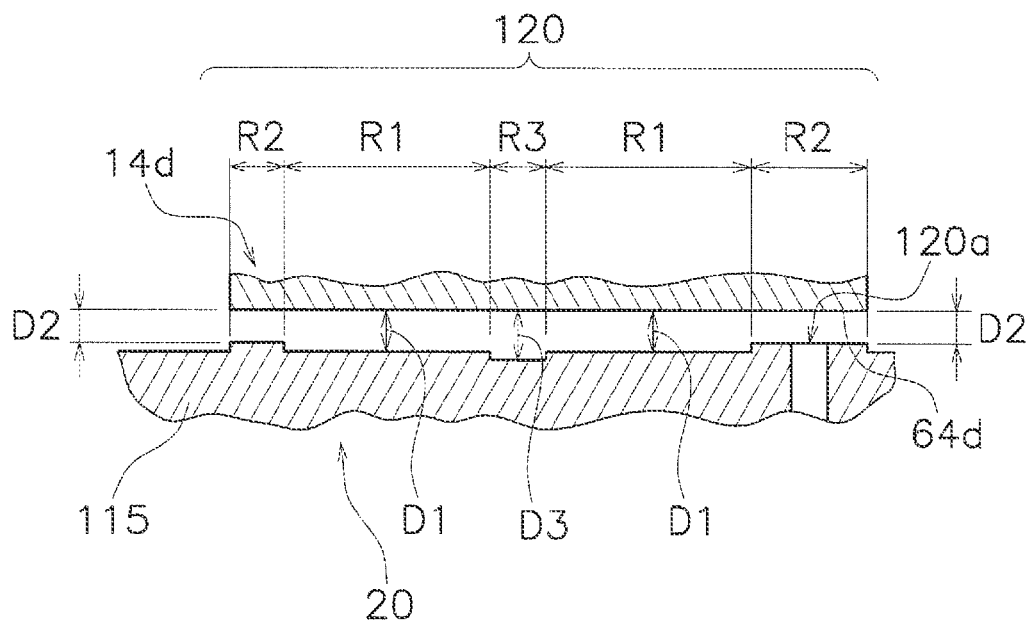
FIG. 8 is a partially enlarged cross-sectional view of a spool shaft.

As illustrated in FIG. 6, FIG. 7, and FIG. 8, the large diameter part 20a has a mounted part 120 (one example of the insertion region). The mounted part 120 is disposed on the outer peripheral portion of the large-diameter section 20a. The shaft mounting portion 14d (refer to FIG. 6) of the spool body 14 is mounted to the mounted part 120 and, more specifically, is disposed on the mounted part 120 by opposing the insertion hole 64d of the shaft mounting portion 14d.

The mounted part 120 has a pin mounting hole 120a disposed in the radial direction of the spool shaft 20. For example, the pin mounting hole 120a is a through-hole that penetrates in the radial direction of the spool shaft 20. Specifically, the pin mounting hole 120a penetrates in the radial direction of the spool shaft 20 at the second region R2 of the mounted part 120 described below. A protruding pin 116 is mounted in the pin mounting hole 120a. The protruding pin 116 is fixed to the pin mounting hole 120a, for example, by caulking.

As illustrated in FIG. 6, the protruding pin 116 protrudes outward from the mounted part 120 (the outer peripheral portion of the shaft body part 115). The protruding pin 116 is formed to be longer than the diameter of the shaft body part 115 in the mounted part 120. In the state in which the protruding pin 116 has been mounted in the pin mounting hole 120a, the two end portions of the protruding pin 116 protrude respectively from the outer peripheral portion of the mounted part 120. The two end portions of the protruding pin 116 engage with the notch part 114 in the shaft mounting portion 14d of the spool body 14.

Also, as illustrated in FIG. 7 and FIG. 8, the mounted part 120 has a first region R1, a second region R2, and a third region R3. A fixing agent, for example, an adhesive is coated in the first region R1, the second region R2, and the third region R3. In FIG. 8, the first gap D1 and the third gap D3 described below are shown through an enlargement that is larger than the size of the actual gaps.

The first region R1 is the region for fixing the spool body 14 to the spool shaft 20 by adhesion. The first region R1 is formed into a ring shape on the outer peripheral portion of the mounted part 120. A plurality of first regions R1, for example, two first regions R1, are disposed on the outer peripheral portion of the mounted part 120 by providing a prescribed space in the direction parallel to the spool shaft 20. Also, the two first regions R1 are provided between two parts of the second regions R2. A difference in the level is formed between the first regions R1 and the second region R2. The diameter of the first region R1 is smaller than the diameter of the second region R2.

A first gap D1 (one example of the first gap) is formed between the first region R1 and the insertion hole 64d of the spool body 14. An adhesive is disposed in the first gap D1. The first gap D1 is larger than the second gap D2 described below. The first gap D1 is set at, for example, 0.05 mm. For example, the adhesive is disposed in the first gap D1 by inserting the spool shaft 20 into the insertion hole 64d of the spool body 14 in a state of having coated an adhesive in the first region R1, the second region R2, and the third region R3. The mode for disposing the adhesive in the first gap D1 is described in details in "3. Assembly and fixation of the spool unit" discussed below.

The second region R2 is primarily a region for positioning the spool body 14 in the radial direction. The second region R2 is a region in which the adhesive is coated thereon. The second region R2 is formed into a ring shape at the outer peripheral portion of the mounted part 120. A plurality of second regions R2 (or two parts of the second region R2), for example, two second regions R2, are disposed on the outer peripheral portion of the mounted part 120 by providing a prescribed space in the direction parallel to the spool shaft 20. Specifically, the two second regions R2 are formed at the two end portions of the mounted part 120. The diameter of the second region R2 is larger than the diameter of the first region R1.

A second gap D2 (one example of the second gap) is formed between the second region R2 and the insertion hole 64d of the spool body 14. The second gap D2 is a very small gap due to being a gap that surrounds the second region R2 for positioning the spool body 14 in the radial direction. An adhesive is disposed in the second gap D2. The second gap D2 is smaller than the first gap D1. The second gap D2 is set at, for example, ≤0.01 mm. For example, the adhesive that includes the excess adhesive from the first gap D1 is disposed in the second gap D2 by inserting the spool shaft 20 into the insertion hole 64d of the spool body 14 in a state of having coated an adhesive in the first region R1, the second region R2, and the third region R3. The mode for disposing the adhesive in the second gap D2 is described in details in "3. Assembly and fixation of the spool unit" discussed below.

The third region R3 is primarily a region in which the adhesive is retained. The third region R3 is also a region in which the adhesive is coated thereon. For example, the excess adhesive discharged from the first gap D1 is retained in the third gap D3. The third region R3 is an annular groove formed into a ring shape at the outer peripheral portion of the mounted part 120. The third region R3 is between two second regions R2. More specifically, the third region R3 is between two first regions R1. A difference in the level is formed between the third region R3 and the first region R1. The diameter of the third region R3 is smaller than the diameter of the first region R1 and the diameter of the second region R2.

A third gap D3 (one example of the third gap) is formed between the third region R3 and the insertion hole 64d of the spool body 14. The third gap D3 is larger than the first gap D1. Specifically, the third gap D3 is larger than the first gap D1 and the second gap D2. An adhesive is disposed in the third gap D3. The third gap D3 is set at, for example, 0.15 mm. For example, the adhesive that includes the excess adhesive discharged from the first gap D1 is disposed in the third gap D3 by inserting the spool shaft 20 into the insertion hole 64d of the pool 14 in a state of having coated an adhesive in the first region R1, the second region R2, and the third region R3. The mode for disposing the adhesive in the third gap D3 is described in details in "3. Assembly and fixation of the spool unit" discussed below.

Here, the first gap D1, the second gap D2, and the third gap D3 are defined by the distance in the radial direction between the outer peripheral surface of the mounted part 120 (the first region R1, the second region R2, and the third region R3) of the spool shaft 20 and the inner peripheral surface of the insertion hole 64d of the spool body 14.

3. Assembly and Fixation of the Spool Unit

First, an adhesive is coated in the first region R1, the second region R2, and the third region R3 in the mounted part 120 of the spool shaft 20. Next, the spool shaft 20 is inserted into the insertion hole 64d in the shaft mounting portion 14d of the spool body 14 from the one end side to the other end side of the shaft mounting portion 14d of the spool body 14. Next, the protruding pin 116 (both end portions) of the spool shaft 20 is engaged with the notch part 114 in the shaft mounting portion 14d of the spool body 14. Specifically, the protruding pin 116 contacts the first contact section 114b and the second contact section 114c of the notch part 114. Accordingly, the spool body 14 is positioned in relation to the spool shaft 20 in the direction parallel to the spool shaft 20 (the axial direction of the spool shaft 20) and in the rotational direction of the spool shaft 20. Also, in this state, both end portions of the mounted part 120 of the spool shaft 20, namely, the second region R2 of the mounted part 120, are disposed so as to oppose both end portions of the insertion hole 64d of the shaft mounting portion 14d. Accordingly, the spool body 14 is positioned in relation to the spool shaft 20 in the radial direction with the spool shaft 20 as reference. Consequently, the second gap D2 that surrounds the second region R2 is a very small gap.

Also, as described herein, when the spool shaft 20 is inserted into the insertion hole 64d in the shaft mounting portion 14d of the spool body 14 in a state in which an adhesive has been coated in the first region R1, the second region R2, and the third region R3, the adhesive is filled evenly in the first gap D1 according to a shearing force functioning on the adhesive. Accordingly, the first gap D1 formed around the first region R1 can be made to function as a space (an adhering space) for adhering the insertion hole 64d in the shaft mounting portion 14d of the spool body 14 and the mounted part 120 of the spool shaft 20. Also, the excess adhesive discharged from the first gap D1 infiltrates the third gap D3, and the third gap D3 is filled. The third gap D3 formed around the third region R3, as described above, can even be made to function as a storage space for the excess adhesive in addition to functioning as an adhering space. Furthermore, the adhesive is held back by the second region R2 and is kept between the two second regions R2 (the first gap D1 and the third gap D3). Also, the excess adhesive that was left between the two second regions R2 (the first gap D1 and the third gap D3) is extruded to the second gap D2 from the first gap D1, and the second gap D2 is filled. Accordingly, the second gap D2 is evenly filled with the adhesive. As described above, it is possible to make the second gap D2 form around the second region R2 to function as an adhering space.

To summarize the above description, the first gap D1 functions as an adhering space. The second gap D2 functions as a space for positioning the spool body 14 in the radial direction in relation to the spool shaft 20 in the second region R2 and, moreover, functions as an adhering space. The third gap D3 functions as an adhering space and, moreover, functions as a storage space for the excess adhesive that infiltrated from the first gap D1.

When the adhesive is disposed between the insertion hole 64d of the spool body 14 and the mounted part 120 of the spool shaft 20 as described above and the prescribed time lapses, the adhesive hardens, and the spool body 14 is fixed to the spool shaft 20.

4. Characteristics (A-1) The present dual-bearing reel 10 is comprised of a reel body 11, a spool shaft 20, and a spool body 14. The spool shaft 20 is rotatably mounted to the reel body 11. The spool body 14 is non-rotatably mounted to the spool shaft 20. The spool body 14 has an insertion hole 64d. The spool shaft 20 is inserted into the insertion hole 64d. The spool shaft 20 has a mounted part 120. The mounted part 120 is inserted into the insertion hole 64d and is disposed to oppose the insertion hole 64d. The mounted part 120 has a first region R1 and a second region R2. A first gap D1 is between the first region R1 and the insertion hole 64d. A second gap D2 that is smaller than the first gap D1 is provided between the second region R2 and the insertion hole 64d.

In the present dual-bearing reel 10, the mounted part 120 of the spool shaft 20 is disposed to oppose the insertion hole 64d. Also, a first gap D1 is between the first region R1 of the mounted part 120 and the insertion hole 64d. A second gap D2 that is smaller than the first gap D1 is also provided between the second region R2 of the mounted part 120 and the insertion hole 64d. Namely, the mounted part 120 of the spool shaft 20 is formed such that the second gap D2 between the second region R2 of the mounted part 120 and the insertion hole 64d is smaller than the first gap D1 between the first region R1 of the mounted part 120 and the insertion hole 64d.

In this configuration, it is possible to fix the mounted part 120 (the section that includes the first region R1 and the second region R2) in the insertion hole 64d by disposing the fixing agent, for example, an adhesive, in the first gap D1 and the second gap D2. In particular, in the present dual-bearing reel 10, the spool body 14 and the spool shaft 20 can be reliably fixed in the first region R1. Also, the second gap D2 between the second region R2 of the mounted part 120 and the insertion hole 64d is smaller than the first gap D1 between the first region R1 of the mounted part 120 and the insertion hole 64d. Therefore, improving the positioning precision of the spool body 14 in the radial direction (hereinafter referred to as the positioning precision of the spool body 14) in relation to the spool shaft 20 in the second region R2 is possible.

(B-1) In the present dual-bearing reel 10, the second region R2 is disposed on both end portions of the mounted part 120.

In this configuration, the second region R2 is disposed on both end portions of the mounted part 120. Therefore, when the mounted part 120 of the spool shaft 20 is inserted into the insertion hole 64d of the spool body 14, the fixing agent, for example, the adhesive, is held back by the second regions R2 on both end portions of the mounted part 120 and is not easily pushed out in the direction parallel to the spool shaft 20. Accordingly, it is possible to reliably hold the prescribed adhesive between the second regions R2 on both end portions of the mounted part 120 (in the direction parallel to the longitudinal direction of the spool shaft 20). Accordingly, the mounted part 120 can be reliably fixed to the insertion hole 64d. Even the fixing agent, for example, the adhesive, in the second gap D2 between the second region R2 and the insertion hole 64d contributes to the fixation of the mounted part 120 and the insertion hole 64d.

(C-1) in the present dual-bearing reel 10, the first region R1 is between the second regions R2 disposed on both end portions of the mounted part 120.

In this configuration, the first region R1 is between the second regions R2 disposed on both end portions of the mounted part 120. Also, the first gap D1 between the first region and the insertion hole 64d is larger than the second gap D2 between the second region R2 and the insertion hole 64d. Accordingly, when the mounted part 120 of the spool shaft 20 is inserted into the insertion hole 64d of the spool body 14, the fixing agent, for example, the adhesive is held back by the second region R2 and is not easily pushed out in the direction parallel to the spool shaft 20. Consequently, it is possible to reliably hold the prescribed adhesive in the first gap D1 (>second gap D2) between the first region R1 and the insertion hole 64d. Accordingly, the mounted part 120 can be reliably fixed to the insertion hole 64d. Even the fixing agent, for example, the adhesive, in the second gap D2 between the second region R2 and the insertion hole 64d contributes to the fixation of the mounted part 120 and the insertion hole 64d.

(D-1) In the present dual-bearing reel 10, the first region R1 is fixed to the insertion hole 64d via a first fixing agent in the first gap D1. The second region R2 positions the spool body 14 in the radial direction and, moreover, is fixed to the insertion hole 64d via a second fixing agent in the second gap D2.

In this case, the primary fixation of the mounted part 120 and the insertion hole 64d is carried out in the first region R1, and the secondary fixation of the mounted part 120 and the insertion hole 64d is carried out by the second region R2. Also, the positioning of the spool body 14 in the radial direction in relation to the spool shaft 20 is carried out in the second region R2. Accordingly, the positioning precision of the spool body 14 can be improved, and the spool body 14 and the spool shaft 20 can be fixed reliably.

(E-1) In the present dual-bearing reel 10, the mounted part 120 also has a third region R3. Plurality of first regions R1 are between the second regions R2 disposed on both end portions of the mounted part 120. The third region R3 is between the plurality of first regions R1. A third gap D3 that is larger than the first gap D1 is between the third region R3 and the insertion hole 64d.

In this configuration, a third region R3 is between the plurality of first regions R1, and a third gap D3 that is larger than the first gap D1 is between the third region R3 and the insertion hole 64d. Accordingly, the fixing agent, for example, the prescribed adhesive that is discharged from the first gap D1 between the first region R1 and the insertion hole 64d, can be held in the third gap D3 (>first gap D1) between the third region R3 and the insertion hole 64d. Consequently, when the mounted part 120 of the spool shaft 20 is inserted into the insertion hole 64d of the spool body 14, the adhesive held back by the second regions R2 is not easily pushed out further in the direction parallel to the spool shaft 20. Also, filling the adhesive in the first gap D1 and the third gap D3 between the second regions R2 in the direction parallel to the spool shaft 20 is possible. Accordingly, the positioning precision of the spool body 14 in relation to the spool shaft 20 can be improved, and the spool body 14 and the spool shaft 20 can be more reliably fixed.

(F-1) In the present dual-bearing reel 10, the third region R3 is fixed to the insertion hole 64d via the fixing agent in the third gap D3. The fixing agent in the third gap includes the fixing agent that infiltrated from the first gap D1.

In this case, the fixing agent, for example, the adhesive, can infiltrate from the first gap D1 between the first region R1 and the insertion hole 64d to the third gap D3 between the third region R3 and the insertion hole 64d. Accordingly, the third region R3 that forms the third gap D3 functions as a region for retaining the excess adhesive. Accordingly, filling the adhesive in the first gap D1 and the third gap D3 is possible, and the spool body 14 and the spool shaft 20 can be more reliably fixed.

Second Embodiment

In the second embodiment, the configuration of the spool shaft 20 varies from that of the first embodiment. The configurations other than that of the spool shaft 20 are the same as those in the first embodiment. Therefore, their description have been omitted here. Also, the same reference symbols are used for the configurations identical to those in the first embodiment. The configurations that lave been omitted here shall be based on the descriptions in the first embodiment.

1. Configuration of the Spool Shaft

Figure 9:
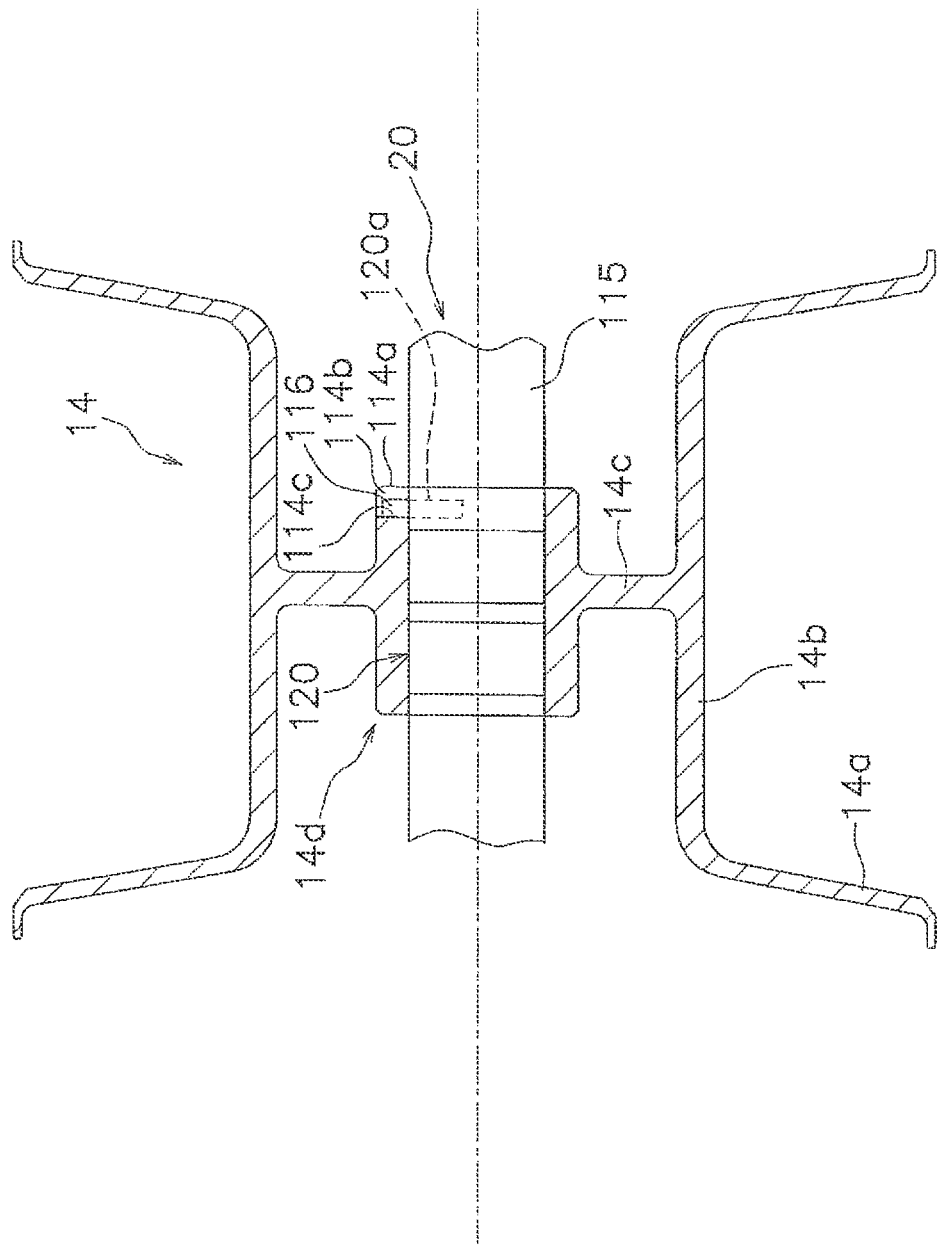
FIG. 9 is a cross-sectional view of the spool unit according to the second embodiment of the present invention.

As illustrated in FIG. 9, the spool shaft 20 has a shaft body part 115 and a protruding pin 116. The mounted part 120 of the shaft body part 115, for example, the large diameter part 20a has a pin mounting hole 120a disposed in the radial direction of the spool shaft 20. The pin mounting hole 120a is a hole with a bottom disposed in the radial direction of the spool shaft 20 in the mounted part 120. A protruding pin 116 is mounted in the pin mounting hole 120a.

The protruding pin 116 protrudes outward from the outer peripheral surface of the shaft body part 115. The protruding pin 116 is shorter than the diameter of the shaft body part 115 in the mounted part 120 and is longer than the depth of the pin mounting hole 120a. In a state in which the protruding pin 116 has been mounted in the pin mounting hole 120a, one end portion of the protruding pin 116 protrudes from the outer peripheral surface of the spool shaft 20, and the other end portion of the protruding pin 116 is disposed inside of the pin mounting hole 120a. For example, the protruding pin 116 is fixed to the pin mounting hole 120a by caulking.

2. Characteristics (A-2) The same effects as (A-1)-(F-1) in the first embodiment can be attained even if the dual-bearing reel 10 is configured as described above.

Third Embodiment

In the third embodiment, the configuration of the spool unit 9 varies from that in the first embodiment. The configurations other than those of the spool unit 9 are the same as those in the first embodiment. Therefore, their descriptions have been omitted here. Also, the same reference symbols are used for the configurations identical to those in the first embodiment. The configurations that have been omitted here shall be based on the descriptions in the first embodiment.

1. Configuration of the Spool Unit

As illustrated in FIG. 10A to FIG. 10C, the spool unit 9 is primarily includes a spool body 14 and a spool shaft 20. The spool body 14 has a shell portion 14b, a flange portion 14a, and a shaft mounting portion 14d.

The shaft mounting portion 14d has a mounting part body 214a and a bent portion 214b. The mounting part body 214a is formed into a cylindrical shape. The bent portion 214b is the portion where one end portion of the mounting part body 214a in the direction parallel to the spool shaft 20 is bent to the inner peripheral side. In other words, the bent portion 214b is formed by partially bending the one end portion of the mounting part body 214a towards the spool shaft 20 side. The bent portion 214b has a third contact section 214c and a fourth contact section 214d. The third contact section 214c contacts the notch part 114 in the rotational direction of the spool shaft 20. The fourth contact section 214d contacts the notch part 114 in the direction parallel to the spool shaft 20.

The spool shaft 20 has a shaft body part 115, a groove part 117, and a mounted part 120. The groove part 117 is provided in the direction parallel to the spool shaft 20 at the outer peripheral portion of the shaft body part 115. The groove part 117 has a pair of first wall parts 117a and a second wall part 117b. The pair of first wall parts 117a is provided to oppose each other in the rotational direction of the spool shaft 20. The second wall part 117b is the wall part that connects the pair of first wall parts 117a. Specifically, the second wall part 117b is the wall part that forms the end portion of the groove part 117.

The groove part 117 includes a notch part 114. The notch part 114 is the section that is disposed on the mounted part 120 in the groove part 117. The notch part 114 is disposed on the end portion of the mounted part 120 of the spool shaft 20 in the direction parallel to the spool shaft 20. The notch part 114 has a pair of first contact sections 114b (one portion of the pair of the first wall parts 117a) and a second contact section 114c (the second wall part 117b).

As illustrated in FIG. 10A and FIG. 10C, the first contact section 114b is one portion of the first wall part 117a. Specifically, the first contact section 114b is formed to the end portion of the mounted part 120 and the end portion of the first wall part 117a. The third contact section 214c of the bent portion 214b makes contact with the first contact section 114b in the rotational direction of the spool shaft 20. The second contact section 114c is the second wall part 117b. The fourth contact section 214d of the bent portion 214b makes contact with the second contact section 114c in the direction parallel to the spool shaft 20.

2. Characteristics (A-3) The same effects as (A-1)-(F-1) in the first embodiment can be attained even if the dual-bearing reel 10 is configured as described above.

Other Embodiments

In the first and second embodiments, a case in which the protruding pin 116 is fixed by caulking is described. However, the mode for fixing the protruding pin 116 can be any mode. For example, the protruding pin 116 can be fixed to the pin mounting hole 120a by adhesion. Additionally, forming a female screw portion on the pin mounting hole 120a, forming a male screw portion on the protruding pin 116, and screwing the protruding pin 116 into the pin mounting hole 120a is possible. Even with this configuration, the same effects as those described above can be attained.

In the first and second embodiments, an example of a case in which the protruding pin 116 is provided to the spool shaft 20 was described. However, the protruding pin 116 can be mounted to the spool body 14. In this case, a pin mounting hole 120a identical to that in the first and second embodiments is formed on the shaft mounting portion 14d of the spool body 14. Also, a groove part 117 (a notch part 114) where the protruding pin 116 is engaged is formed on the spool shaft 20 as in the third embodiment. Even with this configuration, the same effects as those described above can be attained.

The present invention can be used extensively in fishing reels.

What is claimed is:

1. A fishing reel comprising:
a reel body;
a spool shaft configured to be rotatably disposed on the reel body, and having an insertion region with a first region and a second region;
a spool body configured to be non-rotatably fixed to the spool shaft, and having an insertion hole with the insertion region inserted therein and facing the insertion region;
a first gap disposed between the first region and the insertion hole;
a second gap that is smaller than the first gap, and being disposed between the second region and the insertion hole; and
an adhesive disposed in at least one of the first and second gaps.

2. The fishing reel according to claim 1, wherein
the second region has two parts, a first part of the two parts of the second region being disposed on a first end portion of the insertion region, and a second part of the two parts of the second region on a second end portion of the insertion region.

3. The fishing reel according to claim 2, wherein
the first region is disposed between the two parts of the second region.

4. The fishing reel according to claim 1, wherein
the first region is fixed to the insertion hole via a fixing agent in the first gap, and
the second region is configured to position the spool in the radial direction and, is fixed to the insertion hole via the fixing agent in the second gap.

5. A fishing reel comprising:
a reel body;
a spool shaft configured to be rotatably disposed on the reel body, and having an insertion region with a first region, a second region, and a third region, the second region having two parts, a first part of the two parts of the second region being disposed on a first end portion of the insertion region, and a second part of the two parts of the second region being disposed on a second end portion of the insertion region, the first region having at least two first region parts, the at least two first region parts being disposed between the two parts of the second region, the third region being disposed between the at least two first region parts, and a third gap being disposed between the third region and the insertion hole, the third gap being larger than the first gap;
a spool body configured to be non-rotatably fixed to the spool shaft, and having an insertion hole with the insertion region inserted therein and facing the insertion region;
a first gap disposed between the first region and the insertion hole; and
a second gap that is smaller than the first gap, and being disposed between the second region and the insertion hole.

6. The fishing reel according to claim 5, wherein
the third region is fixed to the insertion hole via the fixing agent in the third gap, and
the fixing agent in the third gap includes a portion of the fixing agent over flow from the first gap.

* * * * *